United States Patent
Trinkenschuh et al.

(10) Patent No.: US 10,458,491 B2
(45) Date of Patent: Oct. 29, 2019

(54) CLUTCH SYSTEM

(71) Applicant: Schaeffler Technologies AG & Co. KG, Herzogenaurach (DE)

(72) Inventors: Andreas Trinkenschuh, Bühl (DE); Dierk Reitz, Baden-Baden (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 79 days.

(21) Appl. No.: 15/567,052

(22) PCT Filed: Apr. 14, 2016

(86) PCT No.: PCT/DE2016/200188
§ 371 (c)(1),
(2) Date: Oct. 16, 2017

(87) PCT Pub. No.: WO2016/165712
PCT Pub. Date: Oct. 20, 2016

(65) Prior Publication Data
US 2018/0135707 A1    May 17, 2018

(30) Foreign Application Priority Data

Apr. 17, 2015  (DE) .......... 10 2015 207 008
Aug. 28, 2015  (DE) .......... 10 2015 216 511

(51) Int. Cl.
*F16D 47/04* (2006.01)
*F16D 13/52* (2006.01)
(Continued)

(52) U.S. Cl.
CPC ............ *F16D 47/04* (2013.01); *F16D 13/52* (2013.01); *F16D 13/757* (2013.01); *F16D 27/04* (2013.01);
(Continued)

(58) Field of Classification Search
CPC .......... F16D 47/02; F16D 47/04; F16D 13/52; F16D 27/04; F16D 27/08; F16D 41/00;
(Continued)

(56) References Cited

U.S. PATENT DOCUMENTS 6,343,681 B1    2/2002  Aoki
9,148,190 B1*   9/2015  Buuck .................. H04B 1/38
(Continued)

FOREIGN PATENT DOCUMENTS

| CN | 1690464 A | 11/2005 |
|---|---|---|
| CN | 103438119 A | 12/2013 |

(Continued)

OTHER PUBLICATIONS

International Search Report for PCT/DE2016/200188; 3 pgs; dated Sep. 7, 2016 by European Patent Office.

*Primary Examiner* — Stacey A Fluhart
(74) *Attorney, Agent, or Firm* — LeKeisha M. Suggs

(57) ABSTRACT

A clutch system includes a friction clutch, a ramp system, a pilot clutch, and an actuation element. The friction clutch is for transmitting torque between a torque-introducing element and a torque discharging element. The friction clutch includes a pressure plate. The system is for axially moving the pressure plate. The ramp system has an input ramp and an output ramp. The output ramp is rotatable relative to the input ramp to change an axial extent of the ramp system. The pilot clutch is for initiating rotation of the input ramp relative to the output ramp in response to a speed differential between the torque-introducing element and the torque-discharging element. The actuation element is arranged radially on the inside relative to the friction clutch and is at least partially covered by the friction clutch when viewed in a radial direction.

19 Claims, 4 Drawing Sheets

(51) Int. Cl.
  *F16D 13/75* (2006.01)
  *F16D 27/04* (2006.01)
  *F16D 27/08* (2006.01)
  *F16D 41/04* (2006.01)
  *F16D 41/00* (2006.01)
  *F16D 23/12* (2006.01)
  *F16D 27/00* (2006.01)
  *F16D 121/20* (2012.01)

(52) U.S. Cl.
  CPC ............ *F16D 27/08* (2013.01); *F16D 41/00* (2013.01); *F16D 41/04* (2013.01); *F16D 2023/123* (2013.01); *F16D 2027/007* (2013.01); *F16D 2121/20* (2013.01)

(58) Field of Classification Search
  CPC ......... F16D 2023/123; F16D 2027/007; F16D 13/70; F16D 2121/20; F16D 27/004; F16D 27/115; F16D 27/112
  See application file for complete search history.

(56) References Cited

U.S. PATENT DOCUMENTS

| | | | | |
|---|---|---|---|---|
| 2002/0000353 A1* | 1/2002 | Katou | ................... | F16D 27/115 192/70.12 |
| 2002/0033313 A1* | 3/2002 | Katou | ................... | F16D 27/115 192/55.61 |
| 2002/0134635 A1* | 9/2002 | Teraoka | ................ | F16D 27/115 192/35 |
| 2003/0019706 A1* | 1/2003 | Okude | ................... | F16D 27/115 192/35 |
| 2014/0034440 A1 | 2/2014 | Nagahama | | |
| 2015/0122606 A1* | 5/2015 | Vogel | ..................... | B60L 50/16 192/20 |

FOREIGN PATENT DOCUMENTS

| | | | | |
|---|---|---|---|---|
| CN | 103987983 A | 8/2014 | | |
| DE | 4140122 A1 | 6/1993 | | |
| DE | 102014204336 A1 | 10/2014 | | |
| DE | 102014204338 A1 | 10/2014 | | |
| DE | 102014213486 A1 * | 1/2015 | ............ | F16D 13/52 |
| DE | 102014213486 A1 | 1/2015 | | |
| EP | 0793033 A1 | 9/1997 | | |
| EP | 1473488 A2 | 11/2004 | | |
| JP | 2009257433 A | 11/2009 | | |
| WO | 2011050773 A1 | 5/2011 | | |
| WO | 2013186101 A1 | 12/2013 | | |
| WO | WO-2013186101 A1 * | 12/2013 | ............ | F16D 23/12 |

* cited by examiner

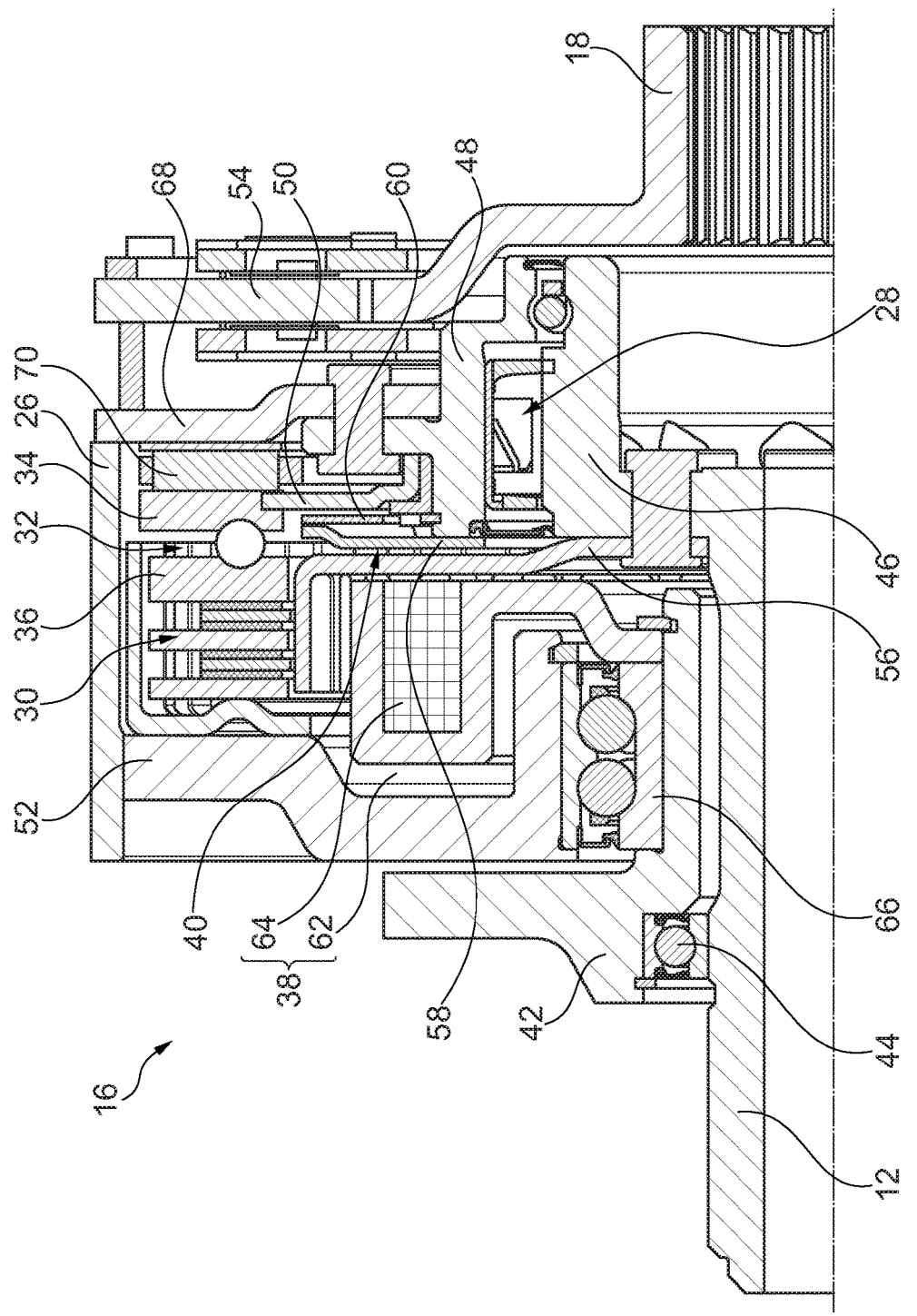

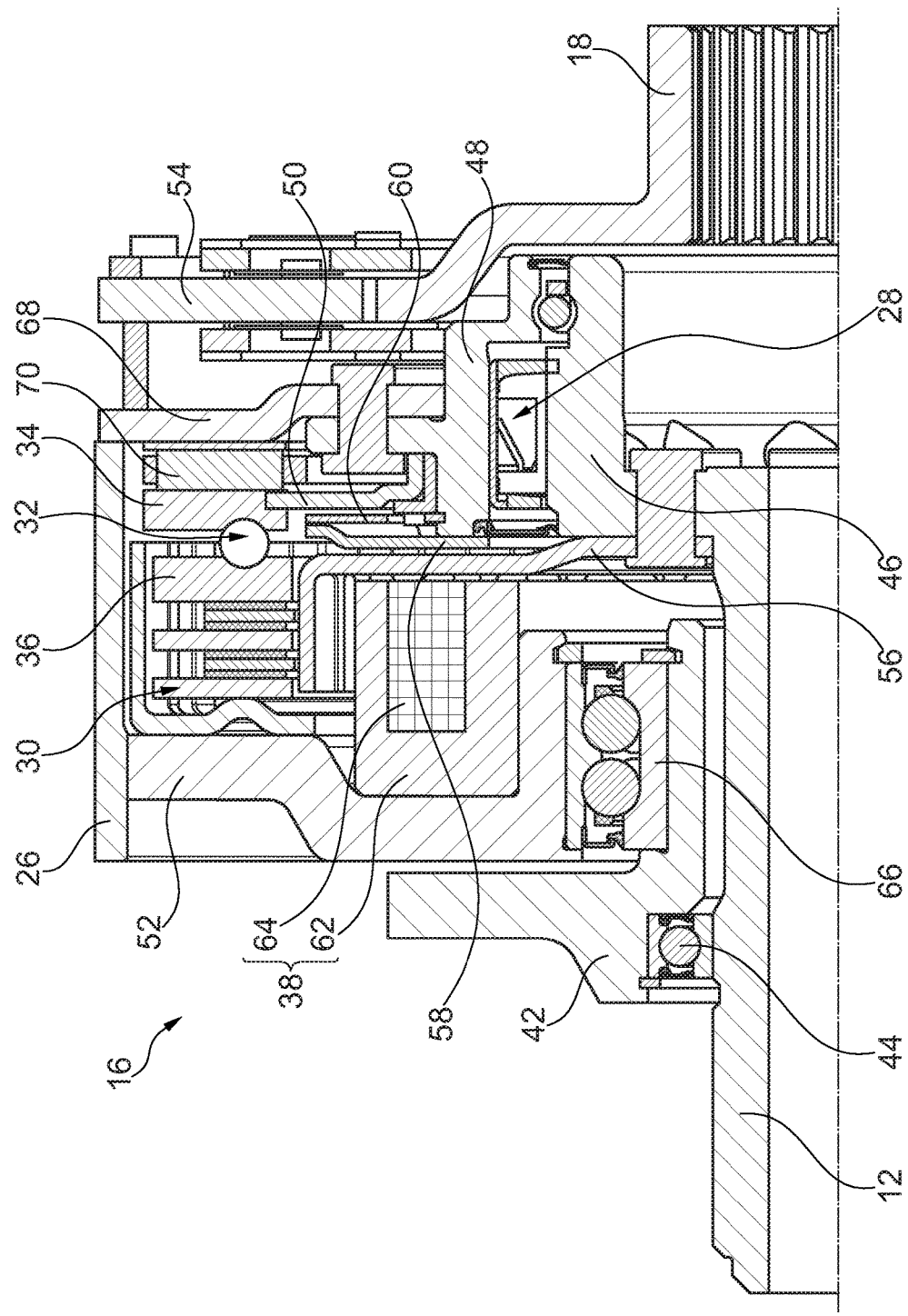

CLUTCH SYSTEM

CROSS-REFERENCE TO RELATED APPLICATIONS

This application is the United States National Phase of PCT Appln. No. PCT/DE2016/200188 filed Apr. 14, 2016, which claims priority to German Application Nos. DE102015207008.5 filed Apr. 17, 2015 and DE1020152016511.6 filed Aug. 28, 2015, the entire disclosures of which are incorporated by reference herein.

TECHNICAL FIELD

The present disclosure relates to a clutch system, with the aid of which a drive shaft of a motor vehicle engine can be coupled to at least one transmission input shaft of a motor vehicle transmission, for example, in a hybrid motor vehicle.

BACKGROUND

WO 2011/050773 A1 discloses a clutch system in the form of a "booster clutch", in which a friction clutch designed as a separating clutch can be actuated with the aid of a ramp system. To close the friction clutch, the ramp system can change its axial extent by means of an output ramp, which can be rotated relative to an input ramp, and can thereby axially move a pressure plate of the friction clutch. It is thereby possible for a clutch disk to be clamped frictionally between the pressure plate and a counterplate of the friction clutch.

There is a need to reduce the installation space requirement of a powertrain, especially in the axial direction.

Thus there is a long-felt need to indicate measures which make possible a powertrain with a small installation space requirement, especially in the axial direction.

BRIEF SUMMARY

According to the invention, the object is achieved by a clutch system having the features of claim 1. Preferred embodiments of the invention are indicated in the dependent claims and the following description, which can each represent one aspect of the invention individually or in combination.

According to the present disclosure, a clutch system for coupling a drive shaft of a motor vehicle engine to at least one transmission input shaft of a motor vehicle transmission is provided, having a friction clutch, a ramp system, a pilot clutch, and an actuation element. The friction clutch may be designed as a multiplate clutch, for example, for transmitting a torque between a torque-introducing element, for example, a drive shaft of the motor vehicle engine, and a torque-discharging element, for example, a transmission input shaft of the motor vehicle transmission. The ramp system is for the axial movement of a pressure plate of the friction clutch. The ramp system has an input ramp and an output ramp, which can be rotated relative to the input ramp to change an axial extent of the ramp system. The pilot clutch is for initiating rotation of the input ramp relative to the output ramp owing to a differential speed between the torque-introducing element and the torque-discharging element. The actuation element is for magnetically actuating the pilot clutch. The actuation element is arranged radially on the inside relative to the friction clutch and is at least partially, for example, largely or entirely, covered by the friction clutch when viewed in a radial direction.

The actuation element and the friction clutch can be nested one within the other. It is thereby possible to reduce axial installation space for the clutch system. It is thereby possible, for example, for the clutch system to be used for a motor vehicle designed as a motorcycle. The ramp system and/or the pilot clutch may be provided on an axial side of the friction clutch facing away from the actuation element, for example, on the transmission side. The actuation element can be inserted at least partially into the friction clutch by means of an axial movement relative to the friction clutch, for example, from an axial side facing away from the ramp system and/or the pilot clutch, for example, the engine side. For example, a depth of insertion of the actuation element into the friction clutch can be limited axially by an input element designed as an inner plate carrier, for example. Radially on the inside, the input element can be coupled to the torque-introducing element and, radially on the outside, can protrude in an axial direction in order to at least partially cover the actuation element in the radial direction.

An output element of the friction clutch, for example, an output element designed as an outer plate carrier, can move past the actuation element on the axial side of the actuation element facing away from the input element, thus enabling the actuation element to be arranged axially between the input element and the output element. In an embodiment, the input element and the output element can substantially entirely cover the actuation element when viewed in an axial direction. In an embodiment, the output element can be supported on a fixed housing or on the torque-introducing element by means of a bearing arranged radially on the inside relative to the actuation element. This makes it possible to use the installation space radially within the friction clutch for further component elements of the clutch system and to reduce the axial installation space requirement. Since the actuation element and the friction clutch can be arranged in such a way as to be nested one within the other, the axial installation space requirement of the clutch system can be kept small, thus making possible a powertrain with a small installation space requirement, especially in the axial direction.

The pilot clutch, the ramp system and the friction clutch can together form a "booster clutch". In the closed state of the friction clutch, the torque-introducing element and the torque-discharging element have substantially the same speed in slip-free operation. In the open state of the friction clutch, the torque-introducing element and the torque-discharging element can rotate at different speeds, with the result that a speed difference arises between the torque-introducing element and the torque-discharging element. The torque flowing via the torque-introducing element and the friction clutch can flow at least partially via the at least partially closed pilot clutch, allowing torque transmission at least temporarily via the ramp system in the closed state of the pilot clutch, thereby making it possible to reduce component loads.

In an embodiment, the pilot clutch brings about slip-free frictional engagement between the torque-introducing element and the torque-discharging element when the input ramp is rotated relative to the output ramp. By means of the slip-free frictional engagement, it is possible to produce in the pilot clutch a speed difference which can be used to rotate the input ramp relative to the output ramp. At the same time, it is also possible in the slipping mode to transmit a torque, which can be passed to the ramp system in order to provide a correspondingly high contact force for the pressure plate. Before speed equalization between the torque-introducing element and the torque-discharging element has occurred, the slipping pilot clutch can convert the speed difference into a rotation of the input ramp relative to the output ramp by means of suitable coupling of the ramp system to the pilot clutch. It is thereby possible to change the axial extent of the ramp system by virtue of the speed difference within the pilot clutch and thus by virtue of the speed difference between the torque-introducing element and the torque-discharging element.

By means of the changing extent of the ramp system, the pressure plate can be moved in order to close the friction clutch, wherein a movement force for moving the pressure plate can be derived from the torque transmitted via the pilot clutch. Once the extent of the ramp system has changed to the extent that, for example, the pressure plate clamps a clutch disk and/or plates of a multiplate clutch, ending of the slipping mode is followed by synchronization of the speeds of the torque-introducing element and of the torque-discharging element, with the result that there is no longer a speed difference. The ramp system can then remain in the position attained.

In the closed position of the friction clutch, the majority of the torque to be transmitted can flow via the friction pair(s) in the friction clutch, wherein a smaller proportion of the torque to be transmitted can be transmitted via the pilot clutch. As a result, it is possible to exert a correspondingly high contact force on the pressure plate via the pilot clutch, thus enabling a correspondingly higher torque to be transmitted reliably and without slippage. Here, a force multiplication can be achieved through a suitable choice of ramp slope for the ramp system, thus making it possible to achieve an increased multiplied contact force with a low actuating force for the actuation of the pilot clutch. Moreover, some of the torque to be transmitted can be used to provide the contact force, and therefore the contact force can be supplied from an additional energy source. By virtue of the fact that the actuating force engages on the pressure plate only indirectly via the pilot clutch, force multiplication and/or torque derivation from the torque to be transmitted can be achieved by means of the pilot clutch in order to close the friction clutch, and therefore the friction clutch can be closed frictionally using a significantly increased contact force, thereby allowing reliable closure of the friction clutch with low design complexity.

By means of the ramp slope of the ramps of the ramp system, force multiplication can be achieved, with the result that the actuating force required to close the pilot clutch is significantly lower than the contact force which can be achieved at the pressure plate. As a result, an actuating system, for example, a magnetic actuating system, can be of significantly smaller and more space-saving dimensions than if the actuating system had to move the pressure plate directly. It is furthermore possible to move the pilot clutch out of the region of the pressure plate. It is thereby possible, especially in comparison with the pressure plate, to position the pilot clutch at least to a large extent radially on the inside relative to the pressure plate, thus allowing installation space radially on the inside relative to friction linings of the clutch disk to be used. It is thereby possible to provide the friction contacts of the clutch disk in a region which is relatively far out radially, and therefore a correspondingly short radially inward extent of the friction clutch is required to enable a correspondingly large friction surface to be achieved. Here, it is possible to make use of the insight that the pilot clutch need only transmit a low torque to actuate the ramp system, and therefore a correspondingly smaller friction surface over a mean friction radius which is smaller in comparison with the clutch disk is sufficient.

The output ramp can be coupled to the torque-discharging element in a manner which prevents relative rotation but allows axial movement. As a result, the output ramp, which is coupled to the torque-discharging element, and the input ramp, which can be coupled to the torque-introducing element by means of the pilot clutch, can be rotated relative to one another when there is a differential speed between the torque-discharging element and the torque-introducing element. The ramps of the ramp system can slide directly on one another or can be rotated relative to one another by way of at least one ball, a cylinder or some other rotatable element, thus enabling a ball-ramp system to be formed. By virtue of the rotation of the ramps relative to one another, the distance between the rear sides of the input ramp and output ramp facing away from the other, opposite ramp in each case can change, allowing the axial extent of the ramp system to decrease or increase accordingly. As a particular preference, the maximum relative angle of rotation of the input ramp relative to the output ramp is limited by at least one stop, for example, thereby making it possible to avoid exceeding a maximum wear range of friction linings of the friction clutch, for example.

In an example embodiment, an output element, for example, an output element designed as an output plate carrier, is supported on a fixed housing or on the torque-introducing element by means of a bearing, wherein the bearing is arranged radially on the inside relative to the actuation element and is at least partially, for example, largely or entirely, covered by the friction clutch and/or the actuation element when viewed in a radial direction. This enables the friction clutch, the actuation element and the bearing to be inserted one inside the other, thereby making it possible to reduce the axial installation space requirement.

The actuation element may have an actuation coil through which a current can flow, wherein the actuation coil is at least partially, for example, largely or entirely, covered by the friction clutch when viewed in a radial direction. This enables at least the actuation coil of the actuation element to be designed to be inserted into the friction clutch. When an electric current is applied, the actuation coil can exert a magnetic force, with the aid of which the pilot clutch can be actuated. For example, the actuation coil can act directly or indirectly on a friction element of the pilot clutch in order to bring about or cancel a friction pairing.

In an example embodiment, the actuation system has a coil housing for receiving and/or magnetically shielding the actuation coil, wherein, in particular, the coil housing is designed to be open toward the pilot clutch. By means of the coil housing, the actuation coil can be electrically insulated, thus making it possible to avoid unwanted current flows and/or to provide adequate electrical safety. Moreover, it is possible to bundle the magnetic field that can be generated by the actuation coil in the direction of the pilot clutch and to intensify it, thus allowing a correspondingly high magnetic force that can be generated by the actuation coil to act on the pilot clutch.

In an embodiment, the actuation element, in particular a coil housing of the actuation element, is connected for conjoint rotation to a fixed housing. As a result, the actuation element is designed to be fixed and not to co-rotate, and therefore electrical connection of the actuation element via electric cables can easily be provided, in particular.

The actuation element, for example, a coil housing of the actuation element, may be connected for conjoint rotation to an output element of the friction clutch, for example, an output element designed as an output plate carrier, or for conjoint rotation to an input element of the friction clutch, for example, an input element designed as an input plate carrier. As a result, the actuation element is not designed to be fixed but is designed to co-rotate, making it easy to fasten the actuation element in the interior of the clutch system and to do so without intermediate components or with a particularly small number of intermediate components. By virtue of the saving of intermediate components in comparison with fixed fastening of the actuation element, the installation space requirement, especially in the axial direction, can be further reduced.

In an example embodiment, the actuation element can be actuated wirelessly, for example, inductively. As a result, the actuation element can be actuated contactlessly. In the case of an actuation element fastened to allow co-rotation, it is thereby possible to avoid unnecessary frictional losses, e.g. due to sliding contacts. For example, an electric current can be induced contactlessly in an actuation coil of the actuation element in the form of an electric machine.

In an embodiment, the pilot clutch has a friction element coupled to the torque-discharging element, wherein, to close the pilot clutch, the friction element can be brought frictionally into contact with an input element of the friction clutch, for example, an input element designed as an input plate carrier, said input element being coupled to the torque-introducing element. When the friction element is moved axially by the actuation element, the friction element can be connected, for example, for conjoint rotation, to the input ramp, e.g. by means of toothing, in order to be able to drive the ramp system in the event of a speed difference and frictional coupling. The friction element can be designed to co-rotate with the input ramp. When there is a speed difference between the torque-introducing element and the torque-discharging element, the input ramp can be coupled to the torque-introducing element via the friction element when the pilot clutch is slipping or completely closed, while the output ramp, for example, in the form of an axially movable steel plate, is coupled to the torque-discharging element. It is thereby possible to change the axial extent of the ramp system in order to actuate the friction clutch until the speed difference between the torque-introducing element and the torque-discharging element has been canceled out in the closed state of the friction clutch.

The pilot clutch may have a return spring for positioning the friction element in a defined initial position corresponding, for example, to an open position of the pilot clutch, wherein the spring force that can be applied to the friction element by the return spring can be overcome by the actuation element. The actuation element can magnetically attract the friction element to itself against the spring force of the return spring, which is designed as a diaphragm spring or leaf spring, for example, in order to close the pilot clutch. As a result, all that is required if a torque flow is desired between the torque-discharging element and the torque-introducing element is to actuate the actuation element. In the case of a hybrid powertrain, an electric machine can be operated in generator mode, allowing the electric energy required for actuation of the pilot clutch to be recovered and stored during braking of the motor vehicle and used for the actuation element.

In an example embodiment, a freewheel, connected in parallel with the friction clutch, for transmitting a torque from the torque-introducing element to the torque-discharging element and for interrupting a torque flow from the torque-discharging element to the torque-introducing element is provided. In the regular traction mode, a torque flow can take place from the torque-introducing element to the torque-discharging element substantially via the freewheel. As a result, a torque produced in a motor vehicle engine designed as an internal combustion engine can be transmitted to a transmission input shaft of a motor vehicle transmission in order to drive the motor vehicle. Since, with this driving strategy, the torque-introducing element overtakes the torque-discharging element, the freewheel is continuously in the locking position thereof and transmits the torque. In the overrun mode, the torque-discharging element can overtake the torque-introducing element, as a result of which, the freewheel moves into its freewheeling position and cannot transmit any torque in the direction of overrun. As a result, torque transmission can take place only via the friction clutch in the overrun mode.

When the friction clutch is closed, a torque can flow from the transmission input shaft to the motor vehicle engine in the overrun mode, e.g. in order to be able to make available an additional braking capacity for braking the motor vehicle with the aid of the mass moment of inertia of the motor vehicle engine. When the friction clutch is open, torque flow from the transmission input shaft to the motor vehicle engine can be prevented in the overrun mode, e.g. in order to allow the motor vehicle to freewheel without unnecessary drag losses due to the mass moment of inertia of the motor vehicle engine in a coasting mode.

In the case of a hybrid motor vehicle, an electric machine can furthermore easily drive the motor vehicle in the motor mode in this situation without having to accept unnecessary drag losses due to the mass moment of inertia of the motor vehicle engine. For the changeover of operating modes in the overrun mode, all that is required is to use the pilot clutch to briefly exploit an existing speed difference between the torque-introducing element and the torque-discharging element to actuate the friction clutch, thus allowing easy and efficient adaptation of torque transmission in a powertrain, for example, that of a hybrid motor vehicle, to different driving strategies.

In an embodiment, the freewheel has an input ring coupled to the torque-introducing element and an output ring coupled to the torque-discharging element, wherein, when closed, the pilot clutch is coupled frictionally to the input ring, for example, indirectly via an input plate carrier of the friction clutch. As a result, the input ring of the freewheel can form a point in the torque flow at which power splitting of the torque can take place. It is thereby possible to ensure that the torque produced by the motor vehicle engine arrives substantially in full at the freewheel and is passed on to the torque-discharging element via the freewheel when in the traction mode. In the case of an overrun mode, when the freewheel is in the freewheeling position, the torque coming from the torque-discharging element can be transmitted to the input ring via the friction clutch, instead of via the output ring of the freewheel, if the pilot clutch has provided a torque flow to the torque-introducing element in the overrun mode. In the traction mode, the entire torque can be made to bypass the pilot clutch and the friction clutch while, in the overrun mode, the torque can be made to bypass the freewheel. The different load paths of the torque to be transmitted in the traction mode and in the overrun mode can thereby be kept very short, thereby making possible a clutch system design which saves installation space.

In an example embodiment, an output element of the friction clutch and/or the torque-discharging element has/have an integrated radial offset compensator, for example, a torque sensor. As a result, the opening and closing of the friction clutch by a speed difference present at the pilot clutch can take place more smoothly. Moreover, a relative rotation of involved component parts of the pilot clutch and of the friction clutch which arises for actuation of the friction clutch can be automatically compensated. In an embodiment, a spring element can be preloaded by the effective torque in the radial offset compensator during the closure of the friction clutch, with the result that the preloaded spring element can automatically open the friction clutch when the applied torque disappears. A changeover between the overrun mode and the traction mode can thereby be achieved in a simple manner without the need for the action of an external control on the friction clutch or the pilot clutch.

In an embodiment, the output ramp of the ramp system is formed integrally with the pressure plate of the friction clutch. As a result, the output ramp can simultaneously form the pressure plate of the friction clutch, resulting in a correspondingly small installation space. An axial side of the output ramp facing the input ramp can be of beveled design in the circumferential direction to form the ramp system, while an axial side of the output ramp facing away from the input ramp can form a friction surface of the pressure plate for the friction clutch.

A rotor of an electric machine may be connected to an output element of the friction clutch and/or to the torque-discharging element. As a result, the clutch system can be easily integrated as a hybrid module into a hybrid motor vehicle. The rotor can interact with a stator of the electric machine in order to introduce a torque into the torque-discharging element in the motor mode of the electric machine and to output a torque in the generator mode of the electric machine. For example, it is easy, in an operating mode in which the motor vehicle is supposed to be driven in a purely electric way and, in this mode, the torque-discharging element overtakes the torque-introducing element, for a torque flow from the electric machine to the motor vehicle engine, which is, for example, switched off, to be interrupted with the aid of the pilot clutch. The electric energy which may be required to actuate the pilot clutch may be derived from the electric machine. To start the motor vehicle engine, it is furthermore possible to close the pilot clutch, thus enabling the electric machine to introduce a starting torque into the motor vehicle engine to start the motor vehicle engine.

The present disclosure furthermore relates to a powertrain for a motor vehicle having a torque-introducing element, for example, a drive shaft of the motor vehicle engine, a torque-discharging element, for example, a transmission input shaft of the motor vehicle transmission, a clutch system, which can be embodied and refined as described above, for transmitting a torque between the torque-introducing element and the torque-discharging element, and an electric machine for transmitting a torque between the electric machine and the torque-discharging element. Since the actuation element and the friction clutch of the clutch system can be arranged so as to be nested one inside the other, the axial installation space requirement of the clutch system can be kept small, thus making possible a powertrain with a small installation space requirement, especially in the axial direction.

BRIEF DESCRIPTION OF THE DRAWINGS

The present disclosure is explained below with reference to the attached figures, in which:

FIG. 5 shows a schematic sectional view of a first embodiment of a clutch system for the powertrain from FIG. 1, and FIG. 6 shows a schematic sectional view of a second embodiment of a clutch system for the powertrain from FIG. 1.

DETAILED DESCRIPTION

Figure 1:
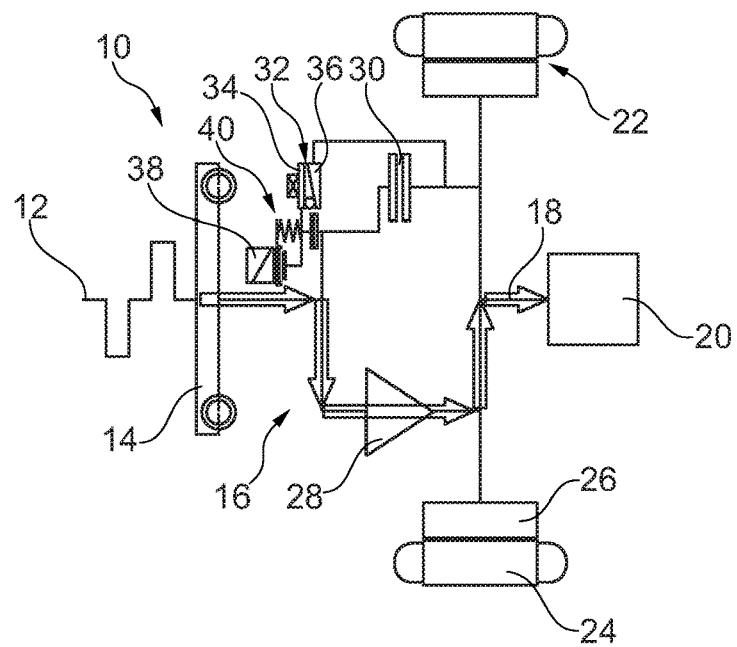
FIG. 1 shows a schematic diagrammatic illustration of a powertrain in the traction mode.

The powertrain 10 illustrated in FIG. 1 has a torque-introducing element 12 in the form of a drive shaft of a motor vehicle engine designed as a crankshaft, which can be coupled to a torque-discharging element 18 in the form of a transmission input shaft of a motor vehicle transmission 20 via a torsional vibration damper 14 in the form of a dual-mass flywheel and a clutch system 16. An electric machine 22 can also engage on the torque-discharging element 18 in order to exchange torque. For this purpose, the electric machine 22 has a stator 24, through which current can flow and which can interact with a rotor 26 coupled to the torque-discharging element 18. A separating clutch can be provided between the torque-introducing element 18 and the clutch system 16 and/or between the clutch system 16 and the torque-discharging element 18 in order to be able to select gears in the motor vehicle transmission 20 while the motor vehicle engine is running.

Figure 2:
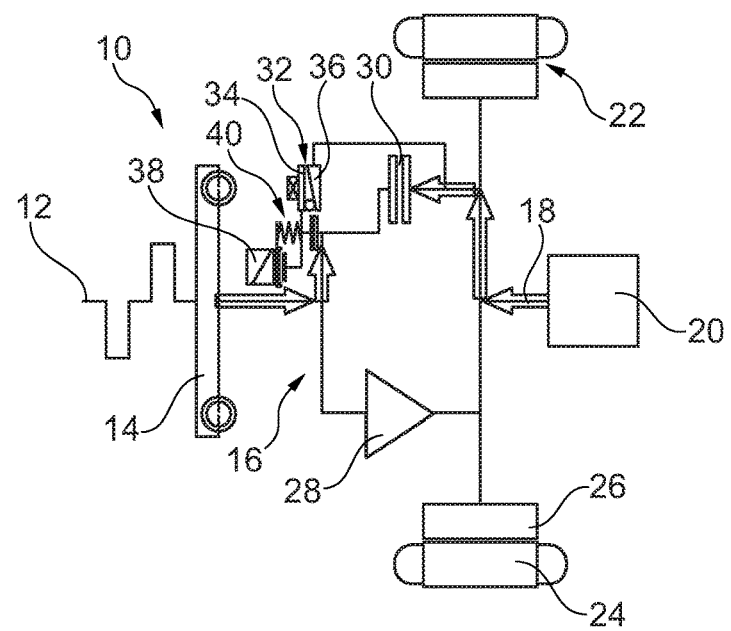
FIG. 2 shows a schematic diagrammatic illustration of the powertrain from FIG. 1 in the case of a changeover from the traction mode to the overrun mode.

The clutch system 16 has a freewheel 28, by means of which the torque produced by the motor vehicle engine can be transmitted from the torque-introducing element 12 to the torque-discharging element 18 in the traction mode illustrated in FIG. 1. When there is a changeover from the traction mode to the overrun mode, as illustrated in FIG. 2, the torque-discharging element 18 can overtake the torque-introducing element 12, with the result that torque can no longer flow via the freewheel 28. In order to transmit torque from the torque-discharging element 18 to the torque-introducing element 12, e.g. to brake the motor vehicle with the aid of the mass moment of inertia of the motor vehicle engine, the torque can be transmitted via a friction clutch 30. To actuate the friction clutch 30, a ramp system 32 is provided, which can change its axial extent by rotation of an input ramp 34 relative to an output ramp 36. For this purpose, the output ramp 36 is coupled to the torque-discharging element 18, while the input ramp 34 can be coupled to the torque-introducing element 12 by means of a pilot clutch 40 that can be actuated with the aid of an actuation element 38.

Figure 3:
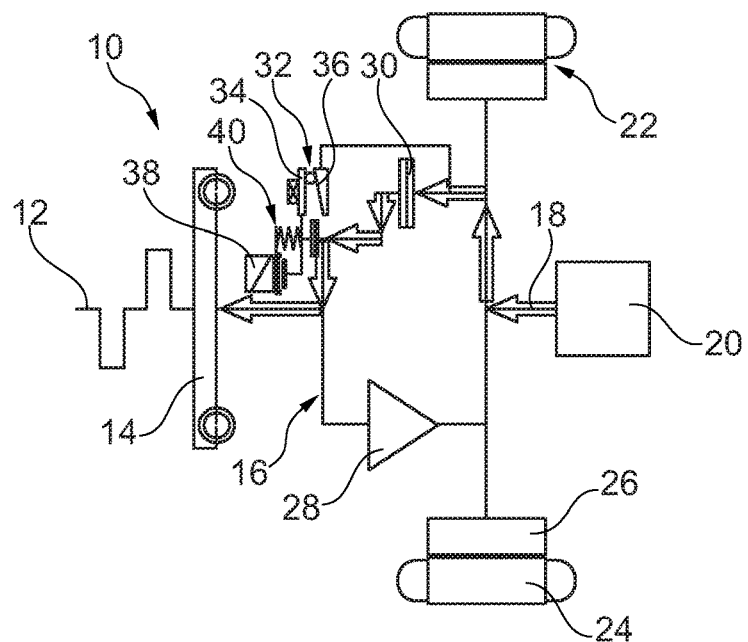
FIG. 3 shows a schematic diagrammatic illustration of the powertrain from FIG. 1 in the overrun mode.
Figure 4:
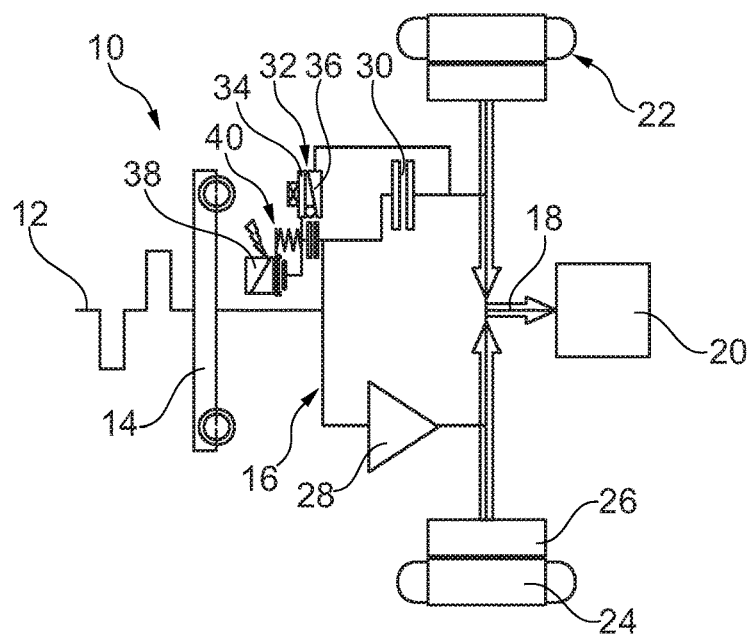
FIG. 4 shows a schematic diagrammatic illustration of the powertrain from FIG. 1 in the purely electric mode.

By means of the speed difference of the torque-introducing element 12 relative to the torque-discharging element 18 in the overrun mode, the input ramp 34 can be rotated relative to the output ramp 36 when the pilot clutch 40 is closed. The axial extent of the ramp system 32 can thereby be increased, as a result of which the friction clutch 30 is closed and a torque flow can take place from the torque-discharging element 18, via the clutch system 16, to the torque-introducing element 12, as illustrated in FIG. 3. It is also possible, in the overrun mode, to open the pilot clutch 40 with the aid of the actuation element 38 and to interrupt a torque flow to the torque-introducing element 12. This is possible, for example, when the motor vehicle is to be driven in a purely electric manner by the electric machine 22, as illustrated in FIG. 4.

As illustrated in greater detail in FIG. 5, the clutch system 16 can have a fixed housing 42, to which the stator 24 of the electric machine 22 is fastened and on which the torque-introducing element 12 can be rotatably supported by means of a pilot bearing 44. The torque-introducing element 12 is connected to an inner ring 46 of the freewheel 28, said inner ring acting as an input ring. The freewheel 28 has an outer ring 48 acting as an output ring, connected for conjoint rotation to an output element 52. The output element 52 is designed as an outer plate carrier of the friction clutch 30, which is designed as a multiplate clutch. The output element 52 is connected to the torque-discharging element 18 by a torque sensor 54 acting as an integrated radial offset compensator.

An input element 56, designed as an inner plate carrier of the friction clutch 30, is furthermore riveted to the inner ring 46 of the freewheel 28. A friction element 58 of the pilot clutch 40 can act on the input element 56 in order to close the pilot clutch 40 by means of the friction pairing that is thereby established. The pilot clutch 40 is designed as "normally open" and has a return spring 60 designed as a leaf spring, which pulls the friction element 58 away from the input element 56 with a corresponding spring force. The friction element 58 is connected by the return spring 60 to a driver ring 50, which is connected rotatably to the input ramp 34 of the ramp system 32 in order to increase the axial extent of the ramp system 32 by virtue of a speed difference between the torque-introducing element 12 and the torque-discharging element 18. Here, the output ramp 36 coupled to the torque-discharging element 18 can simultaneously act as a pressure plate of the friction clutch 30.

The actuation element 38, provided to actuate the pilot clutch 40, has an actuation coil 64 which is inserted in a coil housing 62 and, when there is a current flow, for example, induced contactlessly, generates a magnetic force acting on the friction element 58. The friction element 58 can be produced from a ferromagnetic material. As a result, the actuation element 38 can magnetically attract the friction element 58 in order to establish the friction pairing between the friction element 58 and the input element 56 against the force of the return spring 60 and thereby close the pilot clutch 40. When the pilot clutch 40 is open, a spring force applied by the torque sensor 54, for example, can move the friction clutch 30 automatically into an open position.

The actuation element 38 is fastened for conjoint rotation to the fixed housing 42 by means of the coil housing 62. The output part 52 is supported on the housing by means of a bearing 66. As a result, the actuation element 38 is inserted in the friction clutch 30 axially between the output element 52 and the input element 56 of the friction clutch 30 and radially between the rest of the friction clutch 30 and the housing 42 and/or the torque-introducing element 12, thereby keeping the axial installation space requirement small.

The outer ring 48 of the freewheel 28 is connected for conjoint rotation to the output element 52 of the friction clutch 30 and/or to the rotor 26 of the electric machine 22 and/or to the torque-discharging element 18 by means of a riveted connecting flange 68. The input ramp 34 of the ramp system 32 is supported on the connecting flange 68 by an axial bearing 70. As a result, the axial position of the input ramp 34 is fixed during a rotation of the input ramp 34 relative to the output ramp 36, and, therefore, only the output ramp 36 can be moved in an axial direction, similarly to a steel plate of a multiplate clutch, in order to close and/or open the friction clutch 30.

In comparison with the embodiment of the clutch system 16 illustrated in FIG. 5, the actuation element 38 in the embodiment of the clutch system 16 illustrated in FIG. 6 is designed to co-rotate with the output element 52 of the friction clutch 30, since the coil housing 62 is connected for conjoint rotation to the output element 52. It is thereby possible to eliminate a connection of the coil housing 62 to the fixed housing 42, thus allowing the bearing 66 to be positioned axially further into the friction clutch 30 in the direction of the motor vehicle transmission 20. The axial installation space requirement of the clutch system 16 can thereby be further reduced.

LIST OF REFERENCE SIGNS 10 powertrain
12 torque-introducing element
14 torsional vibration damper
16 clutch system
18 torque-discharging element
20 motor vehicle transmission
22 electric machine
24 stator
26 rotor
28 freewheel
30 friction clutch
32 ramp system
34 input ramp
36 output ramp
38 actuation element
40 pilot clutch
42 housing
44 pilot bearing
46 inner ring
48 outer ring
50 driver ring
52 output element
54 torque sensor
56 input element
58 friction element
60 return spring
62 coil housing
64 actuation coil
66 bearing
68 connecting flange
70 axial bearing

The invention claimed is:

1. A clutch system comprising:
a fixed housing;
a friction clutch for transmitting torque between a torque-introducing element and a torque-discharging element and comprising a pressure plate;
a ramp system for axially moving the pressure plate, comprising:
an input ramp; and,
an output ramp rotatable relative to the input ramp to change an axial extent of the ramp system;
a pilot clutch for initiating rotation of the input ramp relative to the output ramp in response to a speed differential between the torque-introducing element and the torque-discharging element; and,
an actuation element arranged radially on the inside relative to the friction clutch and at least partially covered by the friction clutch when viewed in a radial direction, wherein the actuation element comprises a coil housing connected for conjoint rotation to the fixed housing.

2. The clutch system of claim 1 wherein:
the friction clutch is a multiplate clutch;
the torque-introducing element is a drive shaft of a motor vehicle engine; and,
the torque-discharging element is an input shaft of a motor vehicle transmission.

3. The clutch system of claim 1 wherein the actuation element is for magnetically actuating the pilot clutch.

4. The clutch system of claim 1 wherein the actuation element is entirely covered by the friction clutch when viewed in the radial direction.

5. The clutch system of claim 1 further comprising:
a bearing arranged radially on an inside of the actuation element and at least partially covered by the friction clutch or the actuation element when viewed in the radial direction; and,
an output element supported on the torque-introducing element by the bearing.

6. The clutch system of claim 1 further comprising:
a bearing arranged radially on an inside of the actuation element and at least partially covered by the friction clutch or the actuation element when viewed in the radial direction; and,
an output element supported on the fixed housing by the bearing.

7. The clutch system of claim 1 wherein the actuation element comprises an actuation coil through which a current can flow, the actuation coil being at least partially covered by the friction clutch when viewed in the radial direction.

8. The clutch system of claim 7 wherein the coil housing is configured for receiving and/or magnetically shielding the actuation coil, the coil housing being open toward the pilot clutch.

9. The clutch system of claim 1 wherein:
the friction clutch comprises an output element arranged as an output plate carrier; and,
the coil housing is connected for conjoint rotation to the output element.

10. The clutch system of claim 1 wherein:
the friction clutch comprises an input element arranged as an input plate carrier; and,
the coil housing is connected for conjoint rotation to the input element.

11. The clutch system of claim 1 wherein the actuation element can be actuated wirelessly.

12. The clutch system of claim 11 wherein the actuation element can be actuated inductively.

13. The clutch system of claim 11 wherein:
the pilot clutch comprises a friction element coupled to the torque-discharging element;
the friction clutch comprises an input element coupled to the torque-introducing element; and,
the pilot clutch is arranged to close when the friction element contacts the input element.

14. The clutch system of claim 13 wherein the input element of the friction clutch is an input plate carrier.

15. A powertrain for a motor vehicle comprising:
the clutch system of claim 14;
the torque-introducing element;
the torque discharging element; and, an electric machine for transmitting a torque to the torque-discharging element.

16. The powertrain of claim 15 wherein:
the torque-introducing element is a drive shaft of a motor vehicle engine; and,
the torque-discharging element is a transmission input shaft of a motor vehicle transmission.

17. The clutch system of claim 1 further comprising a freewheel connected in parallel with the friction clutch, wherein the freewheel is arranged to:
transmit a torque from the torque-introducing element to the torque-discharging element; and,
interrupt a torque flow from the torque-discharging element to the torque-introducing element.

18. A powertrain for a motor vehicle comprising:
the clutch system of claim 1;
the torque-introducing element;
the torque discharging element; and,
an electric machine for transmitting a torque to the torque-discharging element.

19. The powertrain of claim 18 wherein:
the torque-introducing element is a drive shaft of a motor vehicle engine; and,
the torque-discharging element is a transmission input shaft of a motor vehicle transmission.

* * * * *